United States Patent
Babayoff et al.

(10) Patent No.: US 7,838,816 B2
(45) Date of Patent: **\*Nov. 23, 2010**

(54) SPECKLE REDUCTION METHOD AND APPARATUS

(75) Inventors: Noam Babayoff, Holon (IL); Yossef Atiya, Maccabim (IL); Tzvi Philipp, Bet Shemesh (IL)

(73) Assignee: Cadent, Ltd., Or Yehuda (IL)

( * ) Notice: Subject to any disclaimer, the term of this patent is extended or adjusted under 35 U.S.C. 154(b) by 408 days.

This patent is subject to a terminal disclaimer.

(21) Appl. No.: 11/715,952

(22) Filed: Mar. 9, 2007

(65) Prior Publication Data

US 2007/0164203 A1 Jul. 19, 2007

Related U.S. Application Data

(63) Continuation of application No. 11/320,632, filed on Dec. 30, 2005, now Pat. No. 7,214,946, which is a continuation of application No. 10/633,304, filed on Aug. 4, 2003, now Pat. No. 7,030,383.

(51) Int. Cl.
*H01J 3/14* (2006.01)
*G02B 7/04* (2006.01)
*G02B 21/00* (2006.01)
*G01N 21/00* (2006.01)

(52) U.S. Cl. .................... 250/234; 250/201.4; 359/368; 356/237.2

(58) Field of Classification Search ...... 250/200–201.9, 250/234–235, 370.8, 458.1, 459.1, 216; 356/318, 356/326, 328, 334, 339, 342, 237.2, 237.4, 356/369, 445–446, 237.1, 239.1–239.8; 359/354–355, 359/368–378, 384, 388

See application file for complete search history.

(56) References Cited

U.S. PATENT DOCUMENTS 4,155,630 A 5/1979 Ih (Continued)

FOREIGN PATENT DOCUMENTS

JP 10-0239036 9/1998

(Continued)

OTHER PUBLICATIONS

Trisnadi, J. I., "Speckle contrast reduction in laser projection displays", Silicon Light Machine, Sunnyvale, California 94089.

(Continued)

*Primary Examiner*—Georgia Y Epps
*Assistant Examiner*—Don Williams
(74) *Attorney, Agent, or Firm*—The Nath Law Group; Derek Richmond; Sung Yeop Chung

(57) ABSTRACT

An apparatus adapted for con focal imaging of a non-flat specimen comprising a coherent light source for producing a light beam, imaging optics adapted to focus the light beam into at least one spot on a surface of a specimen, and a detector adapted to receive and detect light reflected from the specimen surface. The imaging optics comprise at last one optical component located so that the light reflected from the specimen surface passes therethrough on its way to the detector. The optical component is movable so as to move the at least one spot, within a range of movement, to a number of distinct locations in a plane perpendicular to the apparatus' optical axis, within the detector's integration time.

16 Claims, 2 Drawing Sheets

U.S. PATENT DOCUMENTS

| | | | |
|---|---|---|---|
| 4,256,363 A | | 3/1981 | Briones |
| 4,363,961 A | * | 12/1982 | Okada et al. ............. 250/201.3 |
| 4,511,220 A | | 4/1985 | Scully |
| 5,045,679 A | * | 9/1991 | Suzuki et al. ............ 250/201.1 |
| 5,046,795 A | | 9/1991 | Morimoto et al. |
| 5,813,987 A | | 9/1998 | Modell et al. |
| 6,081,381 A | | 6/2000 | Shalapenok et al. |
| 6,288,382 B1 | | 9/2001 | Ishihara |
| 6,449,042 B1 | | 9/2002 | Hamann |
| 6,545,264 B1 | | 4/2003 | Stern |
| 6,577,394 B1 | | 6/2003 | Zavislan |
| 6,750,974 B2 | | 6/2004 | Svetkoff et al. |
| 7,030,383 B2 | * | 4/2006 | Babayoff et al. ....... 250/370.08 |
| 2001/0055462 A1 | | 12/2001 | Seibel |
| 2002/0122246 A1 | | 9/2002 | Tearney et al. |
| 2003/0001072 A1 | * | 1/2003 | Dorsel et al. ............. 250/201.5 |
| 2004/0021871 A1 | | 2/2004 | Psaltis et al. |
| 2005/0036667 A1 | | 2/2005 | So et al. |

FOREIGN PATENT DOCUMENTS

WO     00/08415 A1     2/2000

OTHER PUBLICATIONS

Wang, L., et al., "Speckle reduction in laser projection systems by diffractive optical elements", *Applied Optics*, vol. 37, No. 10, pp. 1770-1775, (1998).

* cited by examiner

SPECKLE REDUCTION METHOD AND APPARATUS

This is a Continuation application of U.S. patent application Ser. No. 11/320,632, filed Dec. 30, 2005, now U.S. Pat. No. 7,214,946 which is a continuation application of U.S. patent application Ser. No. 10/633,304, filed Aug. 4, 2003, now U.S. Pat. No. 7,030,383 the entire contents of which is hereby incorporated by reference in its entirety.

FIELD OF THE INVENTION

This invention relates to the reduction of speckle noise in optical systems comprising imaging optics, in which a coherent light source is used.

BACKGROUND OF THE INVENTION

A common difficulty associated with the use of coherent light sources such as lasers in imaging optical systems is a phenomenon known as speckle. Speckle arises when coherent light scattered from a rough surface is detected by an intensity detector that has a finite aperture, such as an observer's eye or a detector. The image on the screen appears to be quantized into little areas with sizes equal to, the detector resolution spot. The detected spot intensity vanes randomly from darkest, if contributions of the scattering points inside the spot interfere destructively, to brightest if they interfere constructively. This spot-to-spot intensity fluctuation is referred to as speckle. The resultant speckled light signal on the detector appears as spatial and temporal noise in whatever sensor is used in the imaging system.

Speckle reduction is known to involve averaging a number of independent speckle configurations, i.e. obtained from different un-correlated and non-interfering reflecting beams. Since speckle depends on essentially three light parameters: angle, polarization, and wavelength of the illuminating laser beam, independent speckle configurations can be generated through the diversification of any of these three light parameters. To solve the problem of speckle, many attempts have been made, mostly based on angle diversification, obtained by means of diffusers and/or movable optical elements, or by means of polarization diversification.

In U.S. Pat. No. 4,155,630 to Ih, there is disclosed a process and apparatus for improving image creation in a coherent light imaging system which involves directing a diffused light onto a mirror having a rocking motion whereby angle diversification is obtained. The rocking motion causes the reflected rays to sweep a two-dimensional area and focus the reflected light through a diffuser before collimating the rays for use in image creation. Applying a combination of voltages to three independent piezo-electric crystals upon which the mirror is mounted produces the rocking motion of the mirror.

U.S. Pat. No. 6,081,381 to Shalapenok, et al., describes a method and apparatus for eliminating speckle in an optical system by angle diversification obtained by the use of a diffuser and by a rotating micro-lens array having a rotational speed related to the laser parameters. The micro-lens illumination comes off of a stationary diffuser and eventually provides a large area that is uniform and speckle free illumination. U.S. Pat. No. 4,511,220 to Scully, discloses a laser target speckle eliminator for laser tight reflected from a distant target whose roughness exceeds the wavelength of the laser light. The apparatus includes a half-plate wave member, a first polarizing beam splitter member, a totally reflecting right angle prism, and a second polarizing beam splitter member, all of which are in serial optical alignment. Used in combination, the components convert a linearly (i.e., vertically) polarized laser light beam having a known coherence length, into two coincident orthogonally polarized beams that are not coherent with each other.

The resultant beams have an optical path difference exceeding the known coherence length of the laser, thereby eliminating the speckle in that system.

In U.S. Pat. No. 6,577,394 to Zavislan, there is disclosed a scanning laser confocal microscopy system for reducing speckle from scatterers that exist outside (above and below) the section which is being imaged by utilizing orthogonally polarized sheared beams. The sheared beams are focused to spots that are laterally or vertically offset. The polarized beams have opposite senses of circular polarization.

SUMMARY OF THE INVENTION

In accordance with the present invention there is provided a method and apparatus for speckle reduction in an imaging system using coherent light, particularly useful for determining the surface profile of a non-flat object/specimen by confocal imaging. To perform such imaging, the apparatus typically comprises a confocal aperture and means for focusing an incident beam at a plurality of axial locations. In such imaging, also known as confocal microscopy, speckle is particularly problematic because the confocal imaging process requires focusing laser light on the specimen surface when the most speckle occurs.

Thus, the apparatus of the present invention comprises a coherent light source for producing a light beam, imaging optics adapted to focus the light beam into at least one spot on a surface of a specimen, and a detector having an integration time, adapted to receive and detect light reflected from the surface; the imaging optics comprising at least one optical component located so that the light reflected from the specimen surface passes therethrough on its way to the detector, the optical component being movable so as to move the at least one spot to a number of distinct locations in a plane perpendicular to the optical axis within the detector's integration time.

The method of present invention for the confocal imaging a non-flat specimen comprises:

providing an apparatus comprising a source of coherent light and a detector;

focusing the coherent light into at least one spot on a surface of the specimen by means of imaging optics comprising a movable optical component;

directing light reflected by the surface toward the detector via the movable optical component;

detecting the light by the detector; and moving the movable optical component so as to move the at least one spot to a number of distinct locations within the integration time of the detector.

The movement of the optical component is such that a distance between two spot locations that are maximally remote from each other does not exceed the lateral resolution of the apparatus.

The lateral resolution of the apparatus is the minimum lateral distance between two adjacent points on the specimen for which the apparatus can distinguish a difference in height.

Due to the specific location of the movable optical component of the present invention which ensures that both the incident and reflected light passes therethrough, the detector does not feel the movement of the optical component, i.e. the detected image is static.

During the movement of the optical component as defined above, the spot is moved from one location to another. This results in obtaining a number of independent speckle configurations corresponding to the number of the distinct locations of the spot, which are averaged by the detector over its integration time.

The confocal imaging apparatus of the present invention preferably comprises a beam-splitter and the imaging optics include a collimating lens and an objective lens, where at least the objective lens is disposed between the beam-splitter and the specimen.

The movable optical component referred to above may be the objective lens itself or an additional element located between the beam splitter and the specimen. Such additional element may be a transparent wedge or a mirror.

The movement of the optical component may be regular or irregular. One example of the regular movement of the optical component is one that causes the spot on the specimen surface to follow a circular path around the location of the center of the spot if the optical component were static. A circular movement of the objective lens may accomplish this circular path, i.e. the center of the lens moves in a circle about the optical axis.

The invention may be applied equally well to multi-spot confocal systems such as in a confocal scanning apparatus disclosed in the Applicant's publication WO 00/08415. There, the laser light beam is divided into a plurality of beams to obtain a plurality of spots on the specimen surface. In such apparatus, the movable optical element in accordance with the present invention, will move each of the spots in the manner described above.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE INVENTION

Figure 1:
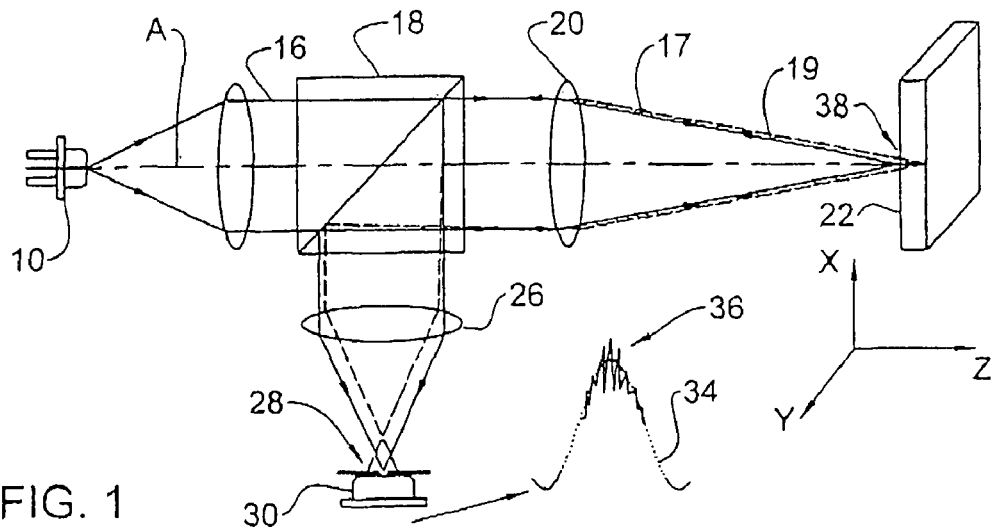
FIG. 1 is schematic view of a confocal scanning system as known in the art.

FIG. 1 shows a typical, apparatus for determining a 3-D profile, or topography, of the surface of an object/specimen, e.g. a tooth, at a desired lateral and axial resolution. The apparatus is a confocal imaging system comprising a laser 10, which constitutes a source of coherent light 12; a collimating lens 14 disposed in front of the laser for collimating the emitted light into a beam 16; a beam splitter 18 through which the collimated beam 16 passes; an optical imaging component in the form of an objective lens 20 for focusing the light beam into a beam 17 (hereinafter 'incident light beam'), on a non-flat specimen 22 whose topography is to be determined. The above components are disposed along an optical axis A. The specimen 22 is shown in a perspective view to emphasize that it contains a depth (in Z-direction coinciding with the optical axis A) as well as a length and a width (in an X-Y plane perpendicular to the optical axis A). The incident light beam 17 that illuminates specimen 22 and forms thereon a spot 38, is reflected back through lens 20, producing a reflected beam 19 which passes through the lens 20 towards the beam splitter 18. The apparatus further comprises an image detector 30 having an integration time, and a focusing lens 26 and a confocal aperture or pinhole 28 disposed between this detector and the beam splitter so that the beam 19 is reflected by the beam splitter 18 towards the detector 30 passes through the focusing lens 26 and the pin-hole 28.

When the specimen 22 is scanned axially (Z-axis), either by axial displacement of the specimen or by axial displacement of the objective lens 20, it will take positions at which the incident light beam 17 will or will not be focused on its surface. In the latter case, the reflected light 19 will be partially blocked by the pinhole 28 thus producing a low intensity signal at the detector 30. As the specimen 22 gets closer to an in-focus position, the amount of light passing through the pinhole 28 increases, yielding a maximum signal from the detector 30 at the best focus.

The intensity of the signal is thus related to the depth (i.e. along the Z-axis) of a scanned point. By imaging at a number of depths (Z-coordinates) an intensity profile can be obtained, which is known as an Optical Section Profile (OSP) 34. The peal of the OSP 34 yields the relative depth, or position, of the surface point on the specimen being scanned. Repeating the depth scanning process for every X and Y location on the specimen surface yields a full 3-D profile, or topography, of the specimen.

The phenomenon of speckle in the reflected light results in a noisy OSP 34, seen as wavy lines 36 in FIG. 1, impairing the accuracy of the depth coordinate determination. The nearer to focus the scanning spot 38 is on the specimen 22, the stronger the speckle contrast becomes, hence the noise recorded by the detector 30 is more significant at the peak of the OSP 34 where it is most unwanted.

Figure 2:
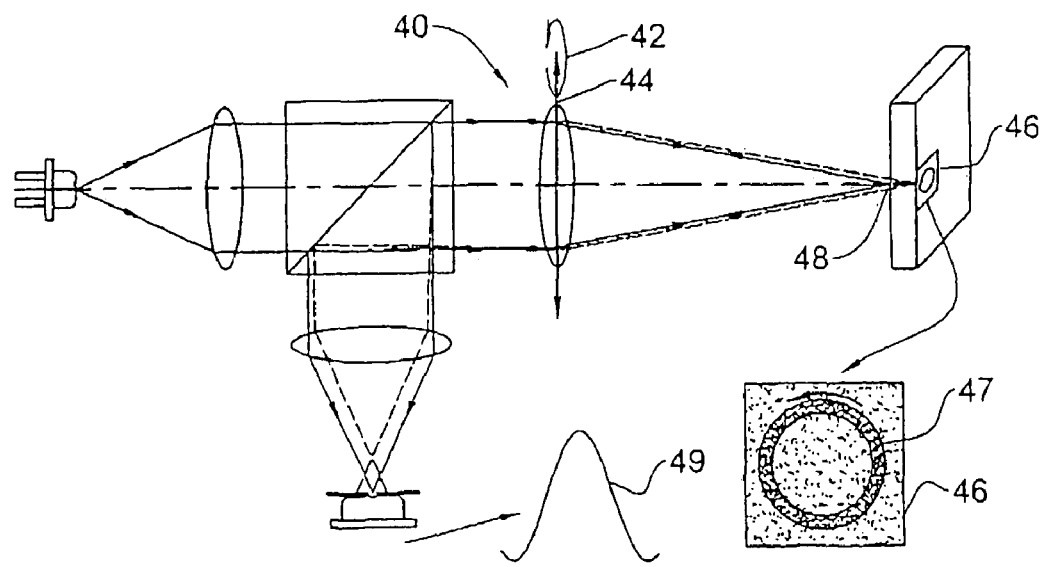
FIG. 2 is schematic view of a confocal scanning apparatus according to an embodiment of the present invention.

FIG. 2 illustrates a first embodiment of the present invention, where in an apparatus similar to that show in FIG. 1, the objective lens 20 has an associated movement mechanism 40 for producing movement of the lens, as indicated by arrows 42 and 44. A possible movement mechanism 42 may be piezo-electric actuator.

The movement of the objective lens 20 is in a periodic manner so that the same path made by a spot 48 on the specimen is repeated at a certain rate. In this path, the spot 48 is moved so as to visit distinct locations within an area 46 of the specimen 22. This path may have any shape, e.g. be circular, oval, square, rectangular, polygonal, non-regular, etc. Spot trace 47 in. FIG. 2 is an example of the footprint of a circular path taken by the spot 48 produced by the movement of the objective lens 20. A circular movement of the objective lens 20 may accomplish this circular path, i.e. the center of the lens moves in a circle about the optical axis A.

The length of the path of the spot 48 is preferably as large as possible, to provide a greater number of independent speckle configurations, corresponding to the number of locations, for maximum statistical sampling. However, the distance between the most remote spot locations during the spot's movement shall be smaller than the lateral resolution of the apparatus. The lens movement is synchronized to the integration time of the detector 30 such that the averaging of the independent speckle configurations may be performed over one full period of spot movement, or a portion of it.

The detector 30 averages out these independent speckle configurations, thereby yielding a relatively smooth OSP 49, as shown in FIG. 2. The averaged signals collected during the integration time may be recorded automatically by known means and will not be discussed further.

The activities described above should be repeated to produce a relatively smooth OSP 49 at each scanned point, to determine the specimen's roughness, or topography.

Figure 3:
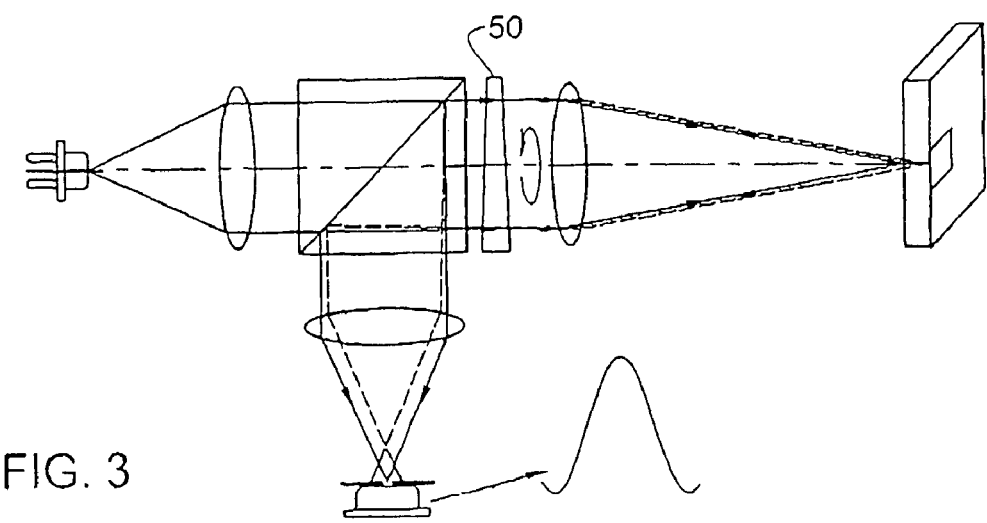
FIG. 3 is schematic view of a confocal scanning apparatus according to a different embodiment of the present invention.

FIG. 3 illustrates an apparatus in accordance with another embodiment of the present invention, which is similar to the apparatus described above with reference to FIG. 2, with the difference being in that it includes a movable optical element in the form of a transparent wedge 50, made for example of glass, disposed between the beam splitter 18 and the objective lens 20, with the latter being static. The wedge 50 is rotatable to stir the incident beam 17 in angle, thereby giving rise to a corresponding movement of the spot 38 on the specimen 22 being scanned, as discussed in connection to FIG. 2.

It should be understood that the wedge 50 is merely an example of a refracting optical element whose rotation can produce a suitable angle diversification of the incident beam 17. Clearly, such element may have any other appropriate shape.

Figure 4:
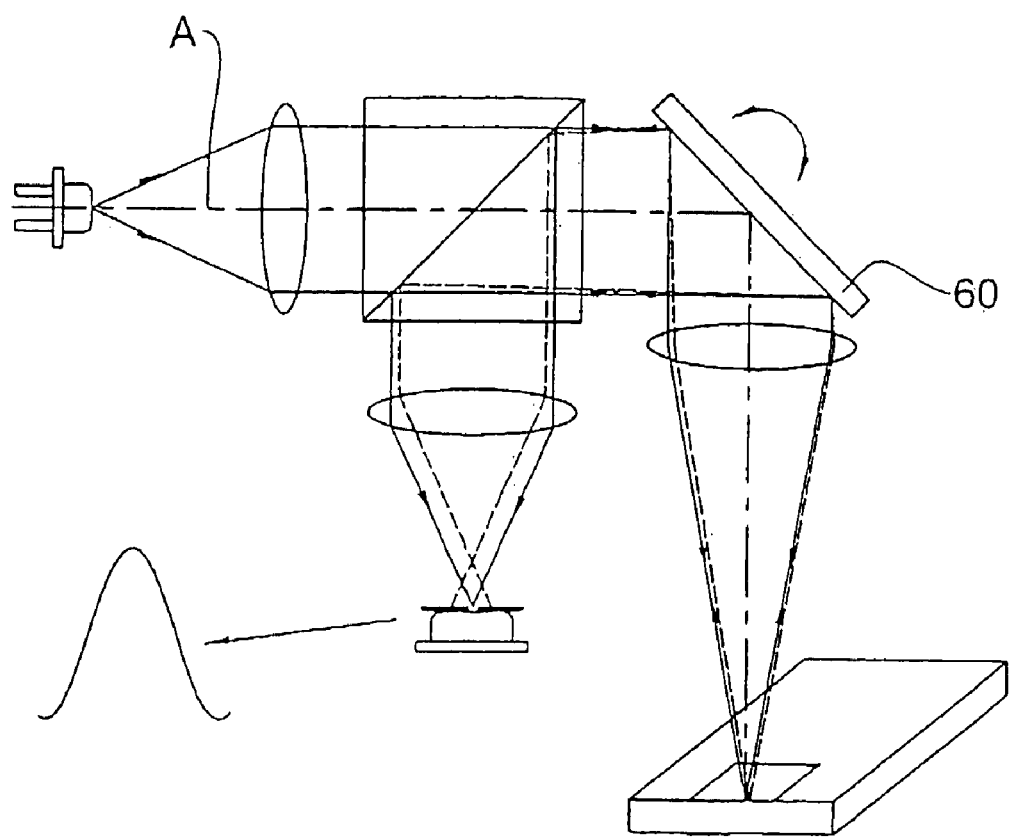
FIG. 4 is schematic view of a confocal scanning according to a further embodiment of the present invention.

FIG. 4 shows an apparatus according to a further embodiment of the present invention, which is similar to the apparatus described above with reference to FIG. 2, with the difference being in that it comprises a rotatable reflecting optical element in the form of a mirror 60 (preferably a dual axis mirror) located between the beam splitter 18 and the objective lens 20, with the latter being static.

The movement of the mirror 60 moves the collimated incident beam 17 in angle thereby giving rise to a corresponding movement of the laser spot on the specimen 22.

A fundamental virtue of the apparatus of the present invention is that, although there are moving optical components (e.g. the objective lens 20, the wedge 50 and the mirror 60) causing a spot to move accordingly on the specimen 22, there is no loss in the imaging (or confocal measurement) quality. The detector 30 does not observe the motion of the light spot on the specimen 22 since the reflected beam 19 passes back through the moving optical component (objective lens 20, wedge 50 and mirror 60). Thus, the spot on the detector remains a stationary diffraction limited spot.

Figure 5:
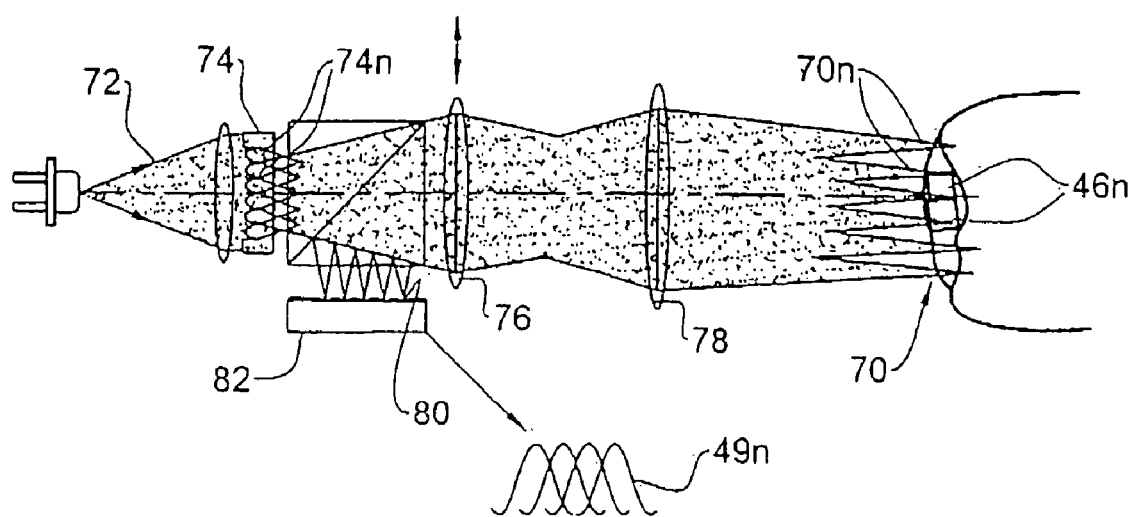
FIG. 5 is schematic view of a confocal scanning according to still further embodiment of the present invention.

FIG. 5 illustrates a further embodiment of the present invention wherein a multi-spot parallel confocal system is used, of the kind disclosed in Applicant's publication WO 00/08415. In this system, a grid or spot array 70 illuminates the specimen 22 (shown as a tooth in FIG. 5) and each spot 70n of the array axially scans the specimen to produce a relatively smooth OSP 49n of the corresponding X-Y area 46n on the specimen 22. In other words, each illuminating spot 70n in the array 70 undergoes a depth scan.

As seen in FIG. 5 a single laser beam 72 is collimated and passes into a micro-lens array 74 comprising a plurality of micro-lenses 74n. The array 74 generates spots at the focal points of the micro-lenses 74, one spot per micro-lens, correspondingly producing the desired spot array 70. The spot array 70 is directed onto the specimen 22, via a beam splitter 75 using magnifying optics including a source objective lens 76 and a specimen objective lens 78. The reflected light is directed, via the same lenses 76 and 78 and the beam splitter 75, toward a detector 82 having an array of n detector elements and having n pinholes 80 corresponding to the micro-lenses 74n of the micro-lens array 74.

A relatively smooth OSP 49n is generated from each detector element of the detector array 82, and thus the Z-coordinate is determined, at each corresponding X-Y area 46n. Again, the confocal scanning is obtained by moving the specimen objective lens 78 along the Z-axis over the desired depth of scan.

Any of the speckle reduction embodiments described hereinabove with reference to FIGS. 2 to 4, may be applied to the multi-spot confocal apparatus It can be appreciated that the above-described speckle reduction apparatus and method can be realized in a variety of embodiments and that those described hereinabove are merely examples. For example, other optical components may be suitable for moving an incident beam on a specimen in order to reduce speckle. Further, the above mentioned components may be used in combination with each other—or with other optical components.

The invention claimed is:

1. An apparatus configured for confocal imaging of a specimen surface of a non-flat specimen, said apparatus having an optical axis and a predetermined lateral resolution and comprising
a coherent light source for producing at least one light beam;
imaging optics configured to focus the at least one light beam into a corresponding focused spot at a desired location on the specimen surface of the non-flat specimen; and
a detector having an integration time and configured to receive and detect light reflected from the specimen surface,
wherein said imaging optics comprises at least one optical component located so that the light reflected from the specimen surface passes therethrough on its way to the detector, said optical component being movable so as to move the focused spot, within a range of movement, to a number of distinct locations close to the desired location in a plane perpendicular to the optical axis, within said integration time of the detector, to provide a plurality of independent speckle configurations, each independent speckle configuration corresponding to a respective one of the distinct locations of the focused spot,
wherein the detector is configured for integrating the plurality of independent speckle configurations within the integration time to provide an integrated signal corresponding to the desired spot.

2. The apparatus according to claim 1, wherein the moving optical component is an objective lens.

3. The apparatus according to claim 2, wherein the objective lens is configured to move circularly about the optical axis.

4. The apparatus according to claim 1, wherein the moving optical component is a reflecting optical element.

5. The apparatus according to claim 4, wherein the reflecting optical element is configured to move on dual axes.

6. The apparatus according to claim 1, wherein the moving optical component is a non-imaging optical element.

7. The apparatus according to claim 6, wherein the moving optical component is a generally wedge-shaped transparent component.

8. The apparatus according to claim 7, wherein the transparent component is made of glass.

9. The apparatus according to claim 7, wherein the transparent component is rotatable about the optical axis of the apparatus.

10. The apparatus according to claim 1, wherein the moving optical component is configured to produce a circular spot pattern on the specimen.

11. The apparatus according to claim 1, wherein the light beam is composed of an array of light beams.

12. The apparatus according to claim 1, wherein the apparatus further comprises a beam-splitter.

13. A method for confocal imaging of a specimen surface of a non-flat specimen, the method comprising:
  providing an apparatus comprising a source of coherent light and a detector;
  focusing at least one beam of the coherent light into a focused spot at a desired location on the specimen surface of the specimen by means of imaging optics comprising a movable optical component and an optical axis;
  directing light reflected by the specimen surface toward the detector via the movable optical component;
  detecting the light by the detector;
  moving the movable optical component so as to move the focused spot to a number of distinct locations close to the desired location in a plane perpendicular to the optical axis within the integration time of the detector to provide a plurality of independent speckle configurations, each independent speckle configuration corresponding to a respective one of the distinct locations of the focused spot; and
  integrating the plurality of independent speckle configurations within the integration time to provide an integrated signal corresponding to the desired spot.

14. A method according to claim 13, wherein the movable optical component moves on dual axes.

15. A method according to claim 13, wherein the movable optical component rotates about an optical axis of the apparatus.

16. A method according to claim 13, wherein the movable optical component produces a circular spot pattern on the specimen.

* * * * *